(12) United States Patent
Noble et al.

(10) Patent No.: US 8,745,096 B1
(45) Date of Patent: Jun. 3, 2014

(54) TECHNIQUES FOR AGGREGATING DATA FROM MULTIPLE SOURCES

(75) Inventors: Matthew R. Noble, Seattle, WA (US); Elena Dykhno, Redmond, WA (US); David J. Whitney, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 582 days.

(21) Appl. No.: 12/751,018

(22) Filed: Mar. 31, 2010

(51) Int. Cl.
*G06F 17/30* (2006.01)

(52) U.S. Cl.
USPC ............................................ 707/811

(58) Field of Classification Search
USPC .............................. 707/809, 810, 811
See application file for complete search history.

(56) References Cited

U.S. PATENT DOCUMENTS

| | | | |
|---|---|---|---|
| 7,752,238 B2* | 7/2010 | Wilmsen et al. | 707/811 |
| 2005/0060332 A1* | 3/2005 | Bernstein et al. | 707/100 |
| 2006/0173868 A1* | 8/2006 | Angele et al. | 707/100 |

* cited by examiner

*Primary Examiner* — Huawen Peng
(74) *Attorney, Agent, or Firm* — Kilpatrick Townsend & Stockton, LLP

(57) ABSTRACT

Systems and methods for providing information responsive to a request. In an embodiment, a request from a requestor is received. A plurality of eligible information sources that are capable of providing data at least partially responsive to the information request are identified. For each identified information source, a data request according to a schema accepted by the identified information source is prepared and responses from the eligible information sources are received. The responses according to a common schema are homogenized and information from the homogenized responses are provided to the requestor.

20 Claims, 3 Drawing Sheets

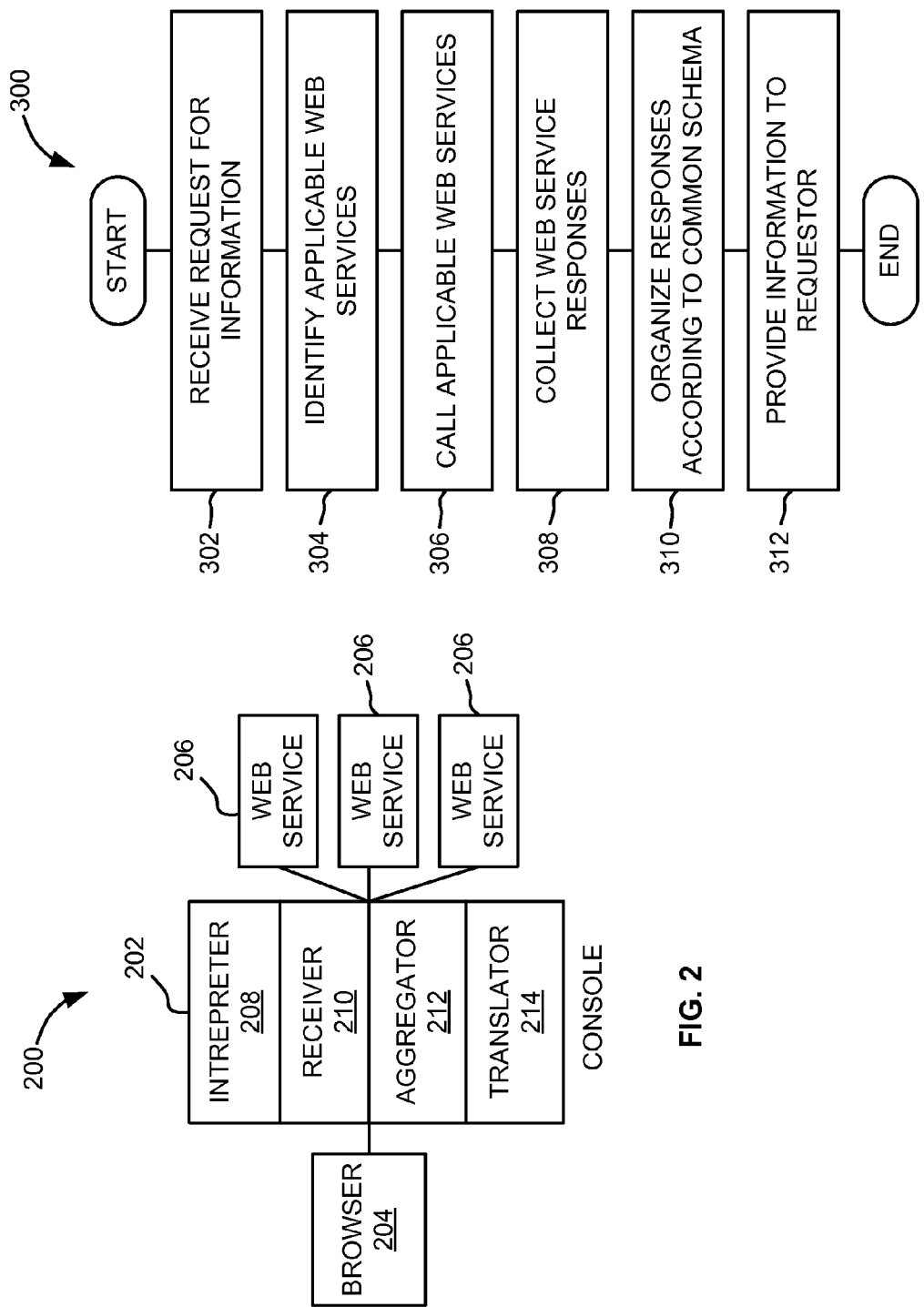

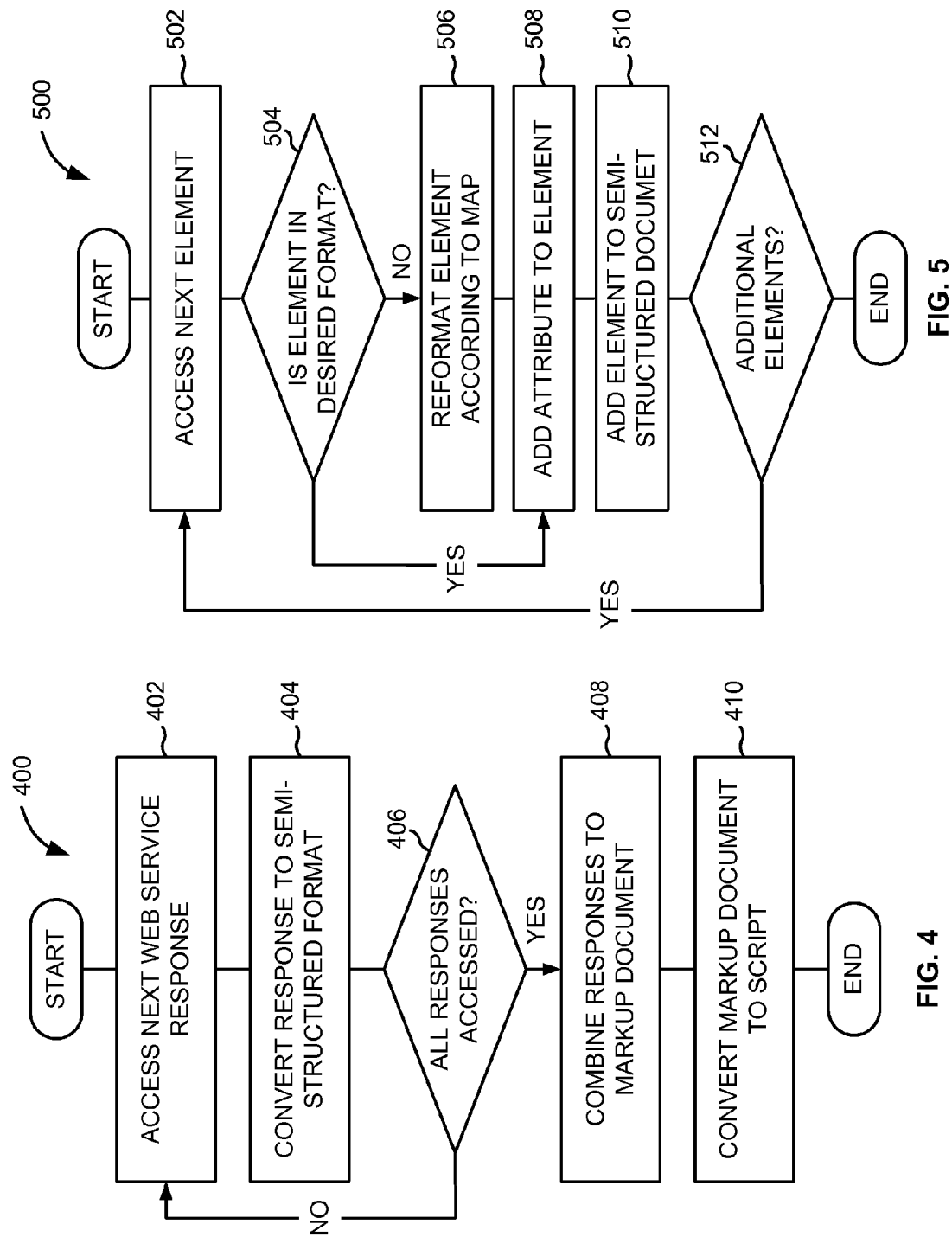

TECHNIQUES FOR AGGREGATING DATA FROM MULTIPLE SOURCES

BACKGROUND

Web services are useful for requesting and receiving information. For example, a computer system may utilize web services in order to access functions and/or information stored on other computer systems across a network, such as the Internet or an intranet. Typically, a computer system makes a call to a web service according to protocol, formatting, and other requirements of the web service and receives a response in return according to a particular schema utilized by the web service. Often, computer systems that invoke web services invoke a single web service or correlated web services that provide information using a common schema. Web services in general, however, utilize various differing schemas, both for requests to the web services and responses from the web services.

Some applications, however, utilize information provided by multiple web services that utilize differing schemas. Because these web services utilize differing schemas, aggregation of data may be difficult because there is often no straightforward way to write aggregation functions such as "join" or "group." As a result, utilization of multiple web services typically requires programmers to have substantial knowledge of the schemas used by the web services which they intend to invoke. Consequently, for a particular application, much time may be spent coding in order to interact with the various web services instead of concentrating on the core functions of the application. Thus, for example, if a developer wishes to utilize information from two different web services that receive requests according to different schemas and provide responses according to different schemas, the developer typically needs to write code that will be able to utilize the data despite that data being in different formats.

BRIEF DESCRIPTION OF THE DRAWINGS

FIG. 2 shows an environment which may utilize one or more components of the environment shown in FIG. 1.

FIG. 3 shows a process for providing information in accordance with an embodiment.

FIG. 4 shows a process for collecting responses from information sources in accordance with an embodiment.

FIG. 5 shows a process for converting an information source response to be organized according to a common schema.

DETAILED DESCRIPTION

Figure 1:
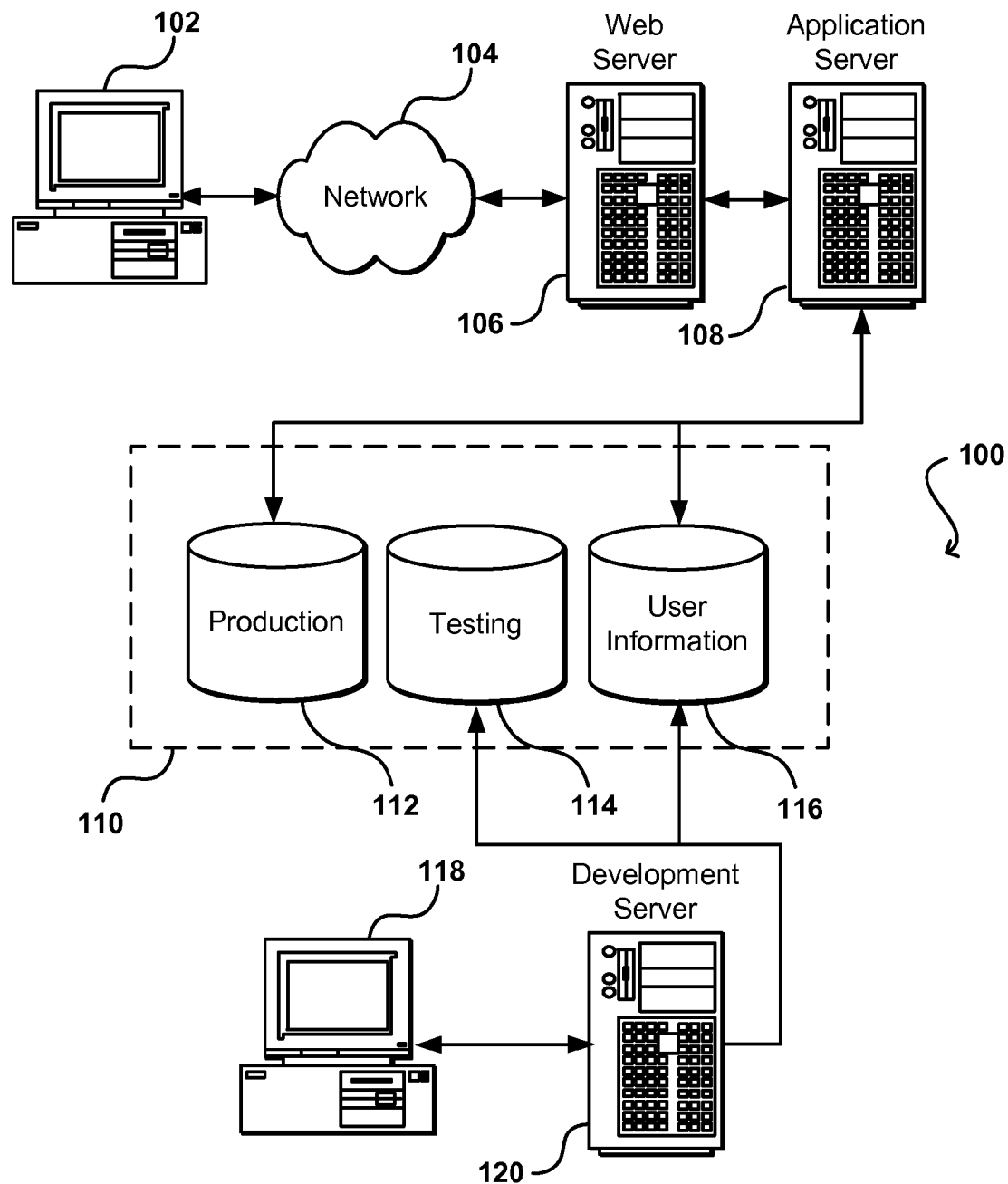
FIG. 1 illustrates an environment in which various embodiments can be implemented.

Disclosed herein are techniques, including systems and methods, for providing information. The information may be requested from another computer system over a network such as the Internet. The information may be collected from various information sources such as web services that utilize various schemas.

In one embodiment, a request for information is received. For example, a user using a browser or other such interface application may have sent a request, such as a hypertext transfer protocol (HTTP) request, upon navigation to a page or other grouping of content, the rendering of which requires information from one or more information sources. Generally, the request may originate from any computing devices operable to provide requests, including the device receiving the request. Requests may be generated, for example, responsive to the operation of one or more applications executing on a computer system. For example, a browser may generate requests as may applications executing on servers.

Upon receipt of the request in an embodiment, one or more applicable information sources such as web services may be identified such that each of the identified information sources is operable to provide at least a portion of the requested information. In an embodiment, information is requested from the identified information sources. Information is requested from each information source according to a schema utilized by each of the information sources. As used herein, a schema is a set of rules for organizing information. For instance, an information source may accept requests for information according to a schema that defines how parameters form the requests should be organized. Similarly, an information source may respond to requests for information according to a schema that defines how responses should be organized. As an example, web services often respond to requests for information using a particular eXtensible Markup Language (XML) schema, although web services and the information sources may provide information utilizing other schemas. The responses from the information sources may then be received, collected, and/or processed. For example, responses from the information sources may be converted to a preliminary format such as a format organizing information according to an XML schema.

In an embodiment, at least a portion of the processed responses are stored according to a common schema. For instance, information from the responses may be stored in a document utilizing an XML schema, such as the preliminary format discussed above, or a document that stores information using a scripting language structure such as a JavaScript Object Notation (JSON) object. Storage of the document may be in volatile or non-volatile memory, or both. In an embodiment, once the responses are stored according to a common schema, information is provided to the requestor, such as by providing a copy of the document to the requestor. For instance, an HTTP document with JavaScript which includes the information in a JSON format may be sent over communications networks such as the Internet to the requestor.

In another embodiment, embodiments of the present disclosure include an aggregation layer or a programming environment for constructing cross-service and cross-service-call data sources in extensible markup language (XML), JavaScript Object Notation (JSON), or other suitable language. The aggregation layer may utilize XQuery or another suitable querying language to map responses from a web service into a uniform structure and may include tools for combining multiple responses in various ways. XQuery programs in the aggregation layer may be tied together using a Spring framework provided by SpringSource® or may be tied together using another suitable framework. In this manner, programmers may take advantage of aggregation functions that utilize data from multiple web services, yet which function generically in the point of view of the programmers.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and to access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

FIG. 2 shows an environment 200 in which various embodiments may be practiced. As will be described below, the environment 200 may include components such as those described above in connection with FIG. 1. As shown in the drawing, in an embodiment, the environment 200 includes a console 202 which receives a request for information from a browser 204 and utilizes a plurality of web services 206 in order to collect and provide the requested information to a browser 204 or other application. As used herein, a web service is an information source, which may be implemented on one or more computing devices, that is operable to receive electronic or other requests for information and provide information responsive to the requests, either electronically or otherwise. The console 202 may be implemented on one of the servers described above, such as the web server 106 described above in connection with FIG. 1. Likewise, the web services 206 may be implemented on an application server such as the application server 108 described above in connection with FIG. 1, or a plurality of application servers or, generally, in any suitable manner. Communication among the console 202, browser 204 and web services 206 may be accomplished over one or more communications networks such as the Internet and/or an intranet. Further, it should be understood that the environment 200 is provided as an illustrative example of an environment and variations are possible. For example, a computing device which may or may not utilize a browser may request information from the console 202. In addition, one or more of the components of the console 202 may be implemented using different computer systems that are in communication with one another.

In an embodiment, the console 202 includes several components such as an interpreter 208, a receiver 210, an aggregator 212 and a translator 214. In an embodiment, each of the components of the console 202 are implemented as executable instructions stored on one or more computer-readable storage media utilized by the console 202. Although various other variations are possible and each component, for example, may be a separate computing device communicably connected to one or more other components. The console 202 may also include additional components which for the sake of clarity are not shown in the drawing and also, while several components are shown and described separately, they may be combined.

The interpreter 208, in an embodiment, is operable to identify web services that are capable of providing some information that is responsive to a request made by the browser 204. For instance, if the browser 204 makes a request for weather data for various geographic locations, the interpreter in an embodiment is able to identify which web services 206 are able to provide at least a portion of the requested data. As an example, the interpreter may identify the request as a request for weather data and identify one or more web services that provide temperature data and one or more web services that provide humidity data. The interpreter, in an embodiment, identifies the web services operable to provide information responsive to their request in accordance with a mapping of request type identifiers to appropriate web services. In an embodiment, the mapping is direct, although the mapping may be composite. For instance, the mapping may associate request types with sets of instructions for making appropriate web service calls. Each set of instructions may identify one or more web services appropriate for a particular request type. Further, the mapping may associate request types with functions able to accept as input requests of an appropriate type and call or cause to be called one or more appropriate web services. In an embodiment, the interpreter utilizes map that associates request types with web services able to provide data that is at least partially responsive to the request. Because web services may differ according to the schema by which they will accept requests, in an embodiment, the interpreter prepares a request to each of the identified web services according to a schema accepted by each web service. Examples are provided below.

The receiver 210, in an embodiment, is operable to receive information from multiple web services 206. The information received may include information according to different schemas. Each web service, for example, may utilize its own XML schema for organizing data in responses. The receiver 210 is operable to combine the information from the multiple web services 206 according to a common schema. In an embodiment, the receiver 210 collects the web service responses and stores them in a document according to a semi-structured format, where a document in a semi-structured format is a document having information stored therein according to one or more conventions. For instance, the receiver 210 may collect web service responses and store information from those responses in a document according to an XML schema. Alternatively, the receiver stores multiple documents according to the common schema, such as one document per web service response received. The receiver may operate according to one or more rules which define how information from the web service responses should be stored according to the XML schema, such as rules that define into which XML elements of the XML schema information is stored. Thus, in an embodiment, the receiver 210 receives web service responses and adds information from the responses into an XML document, translating from the schema of the responses to the schema of the XML document as appropriate.

The aggregator 212 in an embodiment is operable to take the document in the semi-structured format and to convert and modify the document into another form which may be more useful for a particular purpose. For example, the aggregator 212 may group instances of elements of the semi-structured document that are associated with a common attribute into a single structure such as an array, a table, list, or other structure. The aggregator 212 may also assign values for one or more attributes to each element instance of the semi-structured document in order to inform further processing of the document by the translator 214. Examples of attributes that may be utilized appear below. The aggregator 212 may also order the aggregated information from the web services according to one or more rules, such rules specifying an alphabetical, numerical, or other order. In an embodiment, the aggregator 212 includes logic for handling redundant data, such as when two different web services return the same piece of data. Thus, the aggregator 212 may check whether information from a web service response has already been made part of the semi-structured document and, if so, the aggregator may disregard the information as redundant, may mark the information as redundant in the semi-structured document, and/or may otherwise handle the redundancy. This function, and other functions, may also be performed by the translator 214 and/or another component of the console 202. Generally, the aggregator 212 may operate according to any logic that is useful for a particular application. The aggregator 212, in an embodiment, operates according to instructions written in XQuery or another suitable language. In addition, the aggregator 212 may create a document that stores information from the web services and may include attributes with that stored information, where the attributes are indicative of how the stored information should be treated by the translator 214.

The translator 214, in an embodiment, converts the results of the aggregator into a format suitable for passing on to the browser 204 or other application. For example, attributes in the document produced by the aggregator 212 may be used in order to put information from an XML document from the aggregator 212 into JSON, hypertext markup language (HTML), or any other format usable by the browser 204 or other application. As with the aggregator 212, the translator 214 may operate according to XQuery instructions or according to instructions in another suitable language. In certain instances, the translator 214 may not be necessary, such as when an application is operable to receive information in the format utilized by the aggregator 212.

The above environment 200 provides a useful configuration for utilizing XML from web services and providing information in JSON as simple XQuery code may be written to perform complex operations on information provided using various schemas. However, the above description is provided as an illustrative example and, in various embodiments, more or fewer components may be preset than described above. For example, services that utilize other markup languages, scripting languages, or other languages in general may operate utilizing a different configuration than described above. Thus, functions described above as being performed by one or more components may be alternatively performed by other components.

FIG. 3 shows a process 300 for providing information in accordance with an embodiment. The process 300 may be performed utilizing the components of FIG. 2, although other configurations may be used. The process 300, or variations thereof, or any process or method or variation of a process or method disclosed herein, may be encoded onto a computer-readable storage medium that includes executable instructions that cause one or more computer systems to operate in accordance with the process. In an embodiment, a request for information is received 302 from a requestor. The request may originate from a browser or other application, which may be implemented across a communications network. As another example of receiving a request, an application operable to render pages in HTML or another language may request information as part of the rendering process in order to include that information in rendered pages. Generally, any computing device may have sent the request for information that is received. In an embodiment, the request is independent of or agnostic of one or more schemas utilized by web services operable to provide the information. For instance, the request may be made according to a common schema that differs from one or more web service schemas utilized to provide a response to the request. In this manner, users are provided a way of using a generic request in order to access information from multiple web services that utilize different schemas.

In an embodiment, applicable web services for other information sources are identified 304. Identifying the applicable web services may include referencing a map in order to match the request with web services operable to provide information that is at least partially responsive to the request. For instance, an index may be utilized, where the index associates particular generic request types with one or more web services associated with each request type. As another example, a generic request for information may be of a particular type which, when received, invokes a particular function that includes logic that identifies one or more applicable web services. Generally, any mapping of a received request for information to applicable web services may be used.

In an embodiment, once the applicable web services are identified, the identified web services are called 306. In an embodiment, a message is sent to each of the applicable web services according to corresponding schemas utilized by the web services. For example, one web service may accept requests with an object path notation with one-based indices while another may accept requests according to zero-based indices with a different object path, while yet another web service may accept requests according to parameters in headers as well as query parameters. Thus, calling the applicable web services may include translating the received request into a format acceptable by each of the applicable web services. Calls to the applicable web services may be made in any suitable manner, such as in a sequence, in parallel, or as a combination of in sequence and parallel. Further, in some instances, a call to one web service may depend on a response from another. Thus, calling the applicable web services may include sending a call to one or more web services, receiving one or more responses from the called web service(s) and using the one or more responses in order to call one or more other web services. When multiple web service responses are used for requests to other web services, the responses may be aggregated in a suitable manner, such as by combining into a list or other logical structure. As a concrete example of using web service responses in order to call other web services, one or more web services may be called in order to obtain a set of geographical locations according to one or more criteria. When the locations are received, one or more other web services may be called in order to provide current temperatures (or other information) about those locations. Temperatures received may be used to call one or more web services, et cetera.

In an embodiment, responses from the web services are collected 308 and the response are organized 310 according to a common schema. For example, information may be extracted from the web service responses and stored in a document according to an XML or other schema, such as according to a JSON schema. As discussed above, responses may be translated from schemas into which data is sent by the web services into the common schema.

Once the collected responses are collected and stored according the common schema, in an embodiment, information responsive to the requestor's request is provided 312. For example, a document storing the received information in the common schema may be provided to the requestor. As discussed, some or all of the received information may be processed and provided to the requestor in another format, such as in JSON such that the information is rendered in a useful manner on a browser associated with the requestor.

FIG. 4 shows a process 400 for collecting web service responses in accordance with an embodiment. In an embodiment, web service responses are received and stored in a document or in memory in the format in which they are received, although they may be translated to another format, such as into XML. In an embodiment, the received responses are accessed and processed. In an embodiment, the responses are accessed sequentially 402, beginning with a next web service response (which may be the first response). In an embodiment, the response is converted into a semi-structured format 404. Converting the response, for example, may include extracting information from the response and storing the extracted information into an XML file. Converting the response may be performed according to a map that associates element types of particular web service responses with target elements of a common schema. For instance, a web service response including information stored in an instance of a <temp> element according to the web service's schema may be stored into an instance of a <temperature> element of the common schema. In this example, other web service responses that include temperature data may be stored per the mapping into the <temperature> element as well. Converting a response may include nesting elements into other elements, or de-nesting elements, or otherwise changing parent-child relationships in hierarchical schemas.

In an embodiment, a determination is made whether all responses have been accessed 406. If all web service responses have not been accessed, the next web service response is accessed 402, and that response is converted to the semi-structured format, as described above. The response may be converted and stored in the same document or another document. Converting the response to the semi-structured format may include adding information from the web service response to a document storing information according to the semi-structured format, such as the XML file described in the preceding paragraph. If all web service responses have been accessed, then the responses are combined 408 into a markup document (such as the XML document), in accordance with an embodiment. As noted above, while combining the responses is shown in FIG. 4 as a discrete step, combining the responses may be performed in other ways. For instance, as described above, information may be added to an XML document as web service responses are accessed and, in this instance, combining the responses occurs gradually as the process 400 is performed.

In an embodiment, the markup document is converted to script 410 for serving to a requestor of the information in the markup document. For instance, information from the markup document may be converted into one or more JSON objects such that the information may be sent to a requestor as JavaScript. It should be noted that the document may not be converted to a script, but may be converted to another format, or not converted at all. Also, while FIG. 4 shows conversion of the markup document occurring as a discrete step after completion of combination of the responses into the markup document, conversion to script (or another format) may be performed in place of combination of the responses into a markup document or may be performed gradually such that a script is updated every time the markup document is updated.

FIG. 5 shows an example process 500 for converting a web service response into a semi-structured format, in accordance with an embodiment. In an embodiment, elements of a web service response are accessed sequentially, although they may be accessed in another order. Elements may be, for example, XML element instances from a web service response in an XML format. For web service responses in an XML format, XPath may be used for accessing the element instances, although other suitable tools for navigating web service response schemas may be used. As each next element is accessed 502, a determination may be made whether the element is in a desired format 504. If the element is not in a desired format, the element is reformatted 506 into a format of a semi-structured document. Reformatting may proceed according to a map that associates element types of particular web service responses with elements of the semi-structured format. For example, the map may specify that information stored in certain element types of a particular web service response should be stored in certain XML elements. As discussed, the map may associate XML elements of web service responses with XML elements of a semi-structured document.

In an embodiment, once the element is reformatted or it has been determined that reformatting is not necessary, one or more attributes are added to the element 508. An attribute that is added to an element, in an embodiment, may be information indicative of how information associated with the element should be further processed. For example, an attribute of an element may inform which key an element may be assigned as part of a JSON object, whether information from the element will be stored as an object, list, number, string, or other value types, whether conversion of the element to JSON overrides default behaviors, and/or other aspects of conversion to JSON. For instance, the attribute may specify that information in an XML element should be stored in a JSON table or other object. An attribute of an element may also serve as a unique identifier of the element. While FIG. 5 shows the key being added to the element, in some instances, as a discrete step performed subsequent to reformatting the element, it should be understood that adding a key to the element may be part of the reformatting process or otherwise performed.

One or more attributes may also be added to the element in order to inform how information in the element should be combined with other elements. For example, elements relating to various weather data for a weather service (such as temperature, humidity, and the like) may include a city attribute so that information from elements having a common city attribute can be combined to provide a wide range of information about a particular city.

In an embodiment, when the element is reformatted and has a key and any attributes, the element is added to a semi-structured document, such as by storing in an XML file, as described above. Once the reformatted element is stored in the XML file, in an embodiment, a determination is made 512 whether the web service response includes additional elements. If not, the web service response has been completely processed, in accordance with an embodiment. If there are additional elements of the web service response, then the next element is accessed 502 and the process 500 repeats.

It should be noted that FIGS. 4 and 5 show example processes provided for the purpose of illustration, and that other processes may be used, including recursive processes that more efficiently process the information in web service responses than shown in the drawings. For example, as noted, various XQuery or other suitable functions may be used in order to process the web service responses and store information from the responses into a suitable format. Further, the methods by which web service responses are processed may vary depending on the application, the amount of data being processed, and other factors.

As discussed above, embodiments of the present disclosure provide an aggregation layer for constructing cross-service and cross-service-call data sources in XML, JSON, or other languages. Further, embodiments of the present disclosure may be utilized in order to provide a console user interface for allowing users to generically interact with multiple web services without requiring knowledge of the web services' schemas. In other words, embodiments of the present disclosure are particularly useful when exposing operations that touch multiple services, aggregate or structurally manipulate data, and/or other operations that utilize multiple data sources.

As an illustrative example of implementation of an embodiment, the present disclosure may be used in order to provide an interface for obtaining weather data from multiple web services that themselves provide weather data. In this example, the aggregation layer is initialized and configured in the Spring application context. For instance, the following Spring configuration XML may provide a basis for a pipeline for a fictional weather service that is implemented as a Coral service using a fictional "weatherwebservice" query interface. The pipeline in this example provides a framework for deciding which service calls to make in parallel and processing their results using XQuery.

```
<bean id="WeatherServiceBaseServiceCall"
   class="com.webservicedomain.aggregationframework.
pipeline.MappedServiceCall">
   <property name="pipelineConfig">
      <ref bean="PipelineConfiguration"/>
   </property>
   <property                       name="serviceName"
      value="WeatherService"/>
   <property name="errorQuery"
   value="/com/webservicedomain/weatherservice/er-
ror.xq"/>
   <property name="parameterMapper">
      <ref bean="CoralParameterMapper"/>
   </property>
</bean>
<bean id="WeatherServiceAction"
parent="WeatherServiceBaseServiceCall">
   <property name="mapperLocation"
   value="/com/webservicedomain/weatherservice/ac-
tion.xq"/>
   <property name="hasSideEffects" value="true"/>
</bean>
```

```xml
<bean id="WeatherServicePipeline"
    class="com.webservicedomain.aggregationframework.
pipeline.AggregationframeworkPipeline"
    scope="request">
    <property name="aggregationframeworkService">
        <ref bean="AggregationframeworkService"/>
    </property>
    <property name="URIResolver">
        <bean
    class="com.webservicedomain.aggregationframework.
pipeline.MappedURIResolver"/>
    </property>
    <property name="configuration">
        <ref bean="PipelineConfiguration"/>
    </property>
    <property name="pipelineComponents">
        <map/>
    </property>
</bean>
```

The following, in an embodiment, are added to the application context in a console-application framework package in a constructor argument of a service configuration map:

```xml
<entry key="WeatherService">
    <ref bean="WeatherServiceAggregationframework
        ServiceConfig"/>
</entry>
```

The WeatherServiceConfig, in this example, is defined as follows (also in the aggregation framework package):

```xml
<bean
id="WeatherServiceAggregationframeworkServiceConfig"
    class="com.webservicedomain.aggregationframework.
AggregationframeworkConfig">
    <property               name="serviceName"
        value="WeatherService"/>
    <property name="endPoint" value="http://weather.web-
        servicedomain.com"/>
    <property name="serviceVersion" value="2009-03-01"/>
</bean>
```

Thus, the above example so far shows an AggregationFrameworkConfig object to the aggregation package so that other packages can communicate to the weather service with the same client object. This is where an endpoint is specified, as well as the service name and version. In the service-specific package, an AggregationFrameworkPipeline object is defined. This object, in this example, describes a set of XML documents which is produced by mapping XML results from service calls into a shared pseudo-schema (semi-structured format) and possibly by combining other documents in various ways. The map assigned to pipelineComponents (currently empty) holds all the available documents and is where service calls and aggregations may be added. The other two beans (WeatherServiceBaseServiceCall and WeatherServiceAction) hold some default properties for service calls that enable the aggregation framework to map a new service call that returns data, derive a bean from WeatherServiceBaseServiceCall, to map a service call that performs an action which can either succeed or fail, and/or derive from WeatherServiceAction. In this example, each of these depends on an XQuery query. The error.xq code is responsible for mapping an error document from the service into a unified format. The following code will work for WeatherService and may be put in a directory such as webapp/WEB-INF/classes/com/webservicedomain/weatherservice/error.xq):

```
declare variable $service as xs:string? external;
declare variable $action as xs:string? external;
declare variable $endPoint as xs:string? external;
declare variable $statusCode as xs:integer? external;
<resultSet json:type="object">
{
    for $request in //ws:ErrorResponse/ws:RequestId
    let $requestId := $request cast as xs:string
    return
    <rel:error json:combine="list"
            json:key="errors"
            rel:key="{$requestId}">
    {
        if ($service) then
            <service>{$service}</service> else ( ),
        if ($action) then
            <action>{$action}</action> else ( ),
        if ($endPoint) then
            <endPoint>{$endPoint}</endPoint> else ( ),
        <statusCode>{$statusCode}</statusCode>,
        for $code in //ws:Error/ws:Code
        return <errorCode>{$code cast as xs:string}</errorCode>,
        for $message in //ws:Error/ws:Message
        return <message>{$message cast as xs:string}</message>,
        for $type in //ws:Error/ws:Type
        return <errorType>{$type cast as xs:string}</errorType>,
        <serviceResponse>
            { /* }
        </serviceResponse>
    }
    </rel:error>
}
</resultSet>
```

This example uses some external variables for fields that are not normally part of the error response. The aggregation framework's MappedServiceCall class sets these before running error.xq. This example also shows a namespace prefix "ws", which is not defined anywhere in this file. Assuming this service has a namespace "http://weather.weatherinfoserv.com/doc/2009-03-01/", the following may be added to the namespaces map of the PipelineConfiguration bean in applicationContext-aggregationframework.xml:

```xml
<entry key="ws">
    <value>http://weather.weatherinfoserv.com/doc/2009-
        03-01/</value>
</entry>
```

This enables use of the "ws" prefix in the XQuery code without defining it everywhere, thereby making service version upgrades a lot easier. For example, service version upgrades may simply change the namespace and serviceVersion in the aggregationframework package.

The following shows XQuery code for action calls, which may be stored in webapp/WEB-INF/classes/com/webservicedomain/weatherservice/action.xq):

```
declare variable $action as xs:string? external;
<resultSet json:type="object">
{
    <rel:metadata  rel:key="requests"  json:key="requests"
        json:type="object">
        <requestId      json:key="{$action}">{//ws:RequestId/
            text( )}</requestId>
    </rel:metadata>
}
</resultSet>
```

In this example, the request ID is simply added to the result set so the client can ascertain which calls were made. For services that return the request ID in a different place, the script may be modified accordingly.

In summary, the above shows a foundation for providing the weather service example. With that foundation, service calls may be mapped using a MappedServiceCall bean, some XQuery code, and an entry in the pipelineComponents map for the service.

For example, a GetTemperature call may take a list of named locations as parameters and return an XML response such as the following:

```
<GetTemperatureResponse>
    <Temperatures>
        <member>
            <Location>Seattle</Location>
            <Temperature>
                <High>74</High>
                <Low>57</Low>
            </Temperature>
        </member>
        <member>
            <Location>Death Valley</Location>
            <Temperature>
                <High>110</High>
                <Low>98</Low>
            </Temperature>
        </member>
    </Temperatures>
</GetTemperatureResponse>
```

If the GetTemperature service call is able to accept information about a particular location, it may be called according to the following example:
    http://weather.webservicedomain.com/?Action=
        GetTemperature&Location.member.1=
        Death%20Valley&Location.member.2=Seattle
As noted, different services have various conventions about how to accept input. For instance, Coral services use an object path notation with one-based indexes while Xino services use zero-based indexes with a slightly different kind of object path, and some cloud storage solutions may accept parameters in headers as well as query parameters. This example aggregation framework layer adds a layer of abstraction above these conventions so that clients of aggregation framework pipelines can treat all services the same when passing parameters. For instance, a browser may provide a parameter such as "AvailabilityZone=us-east-1a" to the weather service and the service may translate this to "Placement.AvailabilityZone=us-east-1a" according to a mapping and send this to a mapping "<entry key="AvailabilityZone" value="Placement.AvailabilityZone"/>". Similarly, for multiple input values, the weather service may translate "AvailabilityZone=us-east-1a& AvailabilityZone=us-east-1b" to "Placement.AvailabilityZone=us-east-1a& Placement.AvailabilityZone=us-east-1b" according to the same mapping.

The following is an example of a MappedServiceCall bean that will accomplish generic parameter passing:

```
<bean id="WeatherServiceGetTemperature"
        parent="WeatherServiceBaseServiceCall">
    <property name="actionName" value="GetTemperature" />
    <property name="mapperLocation"
    value="/com/webservicedomain/weatherservice/temperature.xq" />
    <property name="parameterMapping">
        <map>
            <entry key="Location">
                <value>Locations.member.#</value>
            </entry>
        </map>
    </property>
</bean>
```

In this example, the MappedServiceCall bean has three functions: identification of the name of the action to pass to the service ("GetTemperature"); identification of the proper XQuery to use to map the response of that call to the normal aggregation framework format; and identification of which parameters to locate in requests from the client and how to translate those into parameters that the underlying service will understand. In this case, the aggregation framework pipeline will accept any number of values for the "Location" parameter and send parameters like "Locations.member.1" and "Locations.member.2" to the WeatherService. The following is an example of how a request would be translated according to the above:
https://console-host/weatherservice/
temperature?Location=Seattle&Location=Death%20Valley
becomes:
http://weather.webservicedomain.com/
?Action=GetTemperature&Locations.member.1=Seattle&
Locations.member.2=Death%20Valley.

This bean may be added to the map of pipeline components in the pipeline:
    <entry key="aggregationframework://temperature">
        <ref bean="WeatherServiceGetTemperature"/>
    </entry>
This registers a pipeline component under a symbolic name ("temperature") so that the name can be used to refer to the component in requests to the aggregation framework.

The following is an example of XQuery code that will translate the output of the call:

```
<resultSet json:type="object">
    <temperature rel:key="Seattle"
            json:combine="list"
            json:key="temperatures">
        <location rel:key="Seattle">Seattle</location>
        <high>74</high>
        <low>57</low>
    </temperature>
    <temperature rel:key="Death Valley"
            json:combine="list"
            json:key="temperatures">
        <location rel:key="Death Valley">Death Valley</location>
        <high>110</high>
        <low>98</low>
    </temperature>
</resultSet>
```

Thus, the structure of what was returned by the service is changed in order to add attributes that control how this XML can be converted into JSON. The example above would come out as follows in JSON:
    {temperatures: [{location: "Seattle", high: 74, low: 57},
    {location: "Death Valley", high: 110, low: 98}]}
Such a structure is easy to utilize in JavaScript and without the annotations it would be difficult to get a reasonable JSON document in an automatic, schema-agnostic way. Another reason for changing the structure of what was returned by a web service is to facilitate aggregation of results from multiple services, and having a shared convention about the structure of result documents provides an advantageous way of accomplishing this. The following is some XQuery code that will produce documents like the one above:

```
<resultSet json:type="object">
{
for $temp in //ws:Temperatures/ws:member
let $loc := $temp/ws:Location cast as xs:string
```

-continued

```
    return
    <temperature rel:key="{$loc}"
        json:combine="list"
        json:key="temperatures">
        <location rel:key=" {$loc} ">{$loc}</location>
        <high> {$temp/ws:Temperature/ws:High cast as xs:string}</high>
        <low> {$temp/ws:Temperature/ws:Low cast as xs:string}</low>
    </temperature>
    }
</resultSet>
```

A file with this code may, for instance, be stored in a location such as webapp/WEB-INF/classes/com/webservicedomain/weatherservice/temperature.xq.

With a query, the pipeline is functional. To get access to it from a web browser, an appropriate framework action may be added, such as an Apache Struts framework action, where the Apache Struts framework is a framework available from the Apache Software Foundation. The aggregation framework provides the AggregationFrameworkPipelineAction class to serve as a generic Struts action for accessing the pipeline. For instance, using Spring, the following can be configured:

```
<bean id="WeatherServicePipelineAction"
class="com.webservicedomain.console.action.
AggregationframeworkPipelineAction"
    scope="request">
    <property name="pipeline">
        <ref bean="WeatherServicePipeline"/>
    </property>
    <property name="result" value="temperature"/>
</bean>
```

All that needs to be configured is an identification of which pipeline the pipeline action uses and what the default result document is. Struts may be configured in struts.xml as follows:

```
<action                                    name="pipeline"
class="WeatherServicePipelineAction">
    <interceptor-ref name="auth"/>
    <result>/pipelinexml.jsp</result>
</action>
<action                                name="pipelineJson"
class="WeatherServicePipelineAction">
    <interceptor-ref name="auth-json"/>
    <result>/pipelinejson.jsp</result>
</action>
<action                                          name="*"
class="WeatherServicePipelineAction">
    <interceptor-ref name="auth-json"/>
    <param name="result">{1}</param>
    <result>/pipelinejson.jsp</result>
</action>
```

The first action takes the result document as a parameter; such as:

/weatherservice/pipeline?result=temperature&Location=Seattle&Location=Death%20Valley The pipelineJson action works the same way, but returns JSON. The third action uses a wildcard to get the result document name, and returns JSON, such as:

/weatherservice/temperature?Location=Seattle&Location=Death%20Valley

In the foregoing paragraphs related to the example seather service, some special XML attributes: json:key, json:type, and json:combine were included. These attributes in this example control an XML→JSON translation process for the weather service. The "[edit] json:key" attribute controls which key the current element will be assigned to when it is part of a JSON object. For example, for example "<foo><bar json:key="baz">YAY</bar></foo>" may result in the JSON object "{baz: "YAY"}." If this attribute is not specified, the local name of the tag may be used.

The "[edit] json:type" attribute in this example controls what type of JSON value is produced for the current element. The choices may be "object", "list", "number", or "string". The default choice may also depend on context. Thus, in an embodiment, if the element has no child elements, it will result in either a number or a string (depending on the text nodes it contains). If the element is totally empty, it will result in an empty string. If the element has child elements, the default choice is "object". Thus, one advantageous use of this attribute is to create lists while another is to ensure that an element will be an object whether it is empty or not.

The "[edit] json:combine" attribute allows overriding of default behavior in this example. For instance, when two elements with the same key (according to json:key or the tag name) appear in a parent element whose type is "object", the default behavior may be to output only the last element with the key. The "json:combine" attribute allows you to override that behavior, such as by specifying json:combine="list" on an element to indicate that it will be added to a list in the parent object under its key. Thus, for example:

```
<foo>
    <bar>one</bar>
    <baz json:key="bar" json:combine="list">two</baz>
</foo>
``` may result in "{bar: ["one", "two"]}." In addition, an json:combine="first" attribute may be specified in order to make the current element appear instead of any elements that follow with the same key. If multiple elements with the same key can specify different values of json:combine; the last value may be the one that causes an associated element to appear.

In practice, json:combine is usually the preferred way to create a list in the JSON output and typically the items in a list will be the sort of items one would want to group, merge, and aggregate. Therefore, it may be undesirable to depend on elements keeping the same parent node in the output. However, with these three attributes one can have control of JSON output, especially when merging documents together.

As discussed, data may be aggregated from multiple calls. In the present example, two basic strategies may be used. For instance, for sharing input parameters to the original request between a static set of calls, a useDocs parameter may be used with the rel:result-set( ) function. For making a dynamic set of calls, possibly overriding parameters from the original request, a BatchResultCallable class may be used.

In the weather service example, a request to the aggregation framework such as /weatherservice/temperature may result in only one pipeline component being used (the one that produces the "result document"). Use of additional components may be accomplished by specifying the useDocs parameter, which may be a comma-separated list of component names (e.g. "temperature,humidity"). The useDocs parameter may also be given multiple times with different values (e.g. "useDocs=tempareature&useDocs=humidity"). If the result component is not built to aggregate multiple documents, this may not do anything except create more overhead. Therefore, this feature may be useful when the result document does some aggregation. For example, there may be a mapped a "GetHumidity" call that produces XML like the following when mapped:

```
<resultSet json:type="object">
    <humidity rel:key="Seattle" json:key="humidities" json:
        combine="list">
        <location rel:key="Seattle">Seattle</location>
        <relativeHumidity>35%</relativeHumidity>
```

```
</humidity>
<humidity rel:key="Death Valley" json:key="humidities"
    json:combine="list">
  <location rel:key="Death Valley">Death Valley</location>
  <relativeHumidity>21%</relativeHumidity>
</humidity>
</resultSet>
```

A pipeline component that will group all the requested documents by location may be built in order to get a complete picture of the weather at each location. Since this component in this example does not make a service call on its own the XQueryProcessingStep class may be used to define it:

```
<bean id="GroupByLocation"
    class="com.webservicedomain.aggregationframework.
pipeline.XQueryProcessingStep">
  <property name="querySource"
    value="/com/webservicedomain/weatherservice/by_location.xq"/>
</bean>
```

The query may be written as:

```
import module namespace rel="http://ws.weatherinfoserv.com/xmlns/relations/2009-03-19" at "/com/webservicedomain/aggregationframework/rel.xq";
rel:group-results(rel:merge((rel:result-set("temperature"),
    rel:result-set("humidity"))), ("location"))
```

Therefore, if this was added to the pipeline as "by-location", it would be possible to make a request to get the temperature and humidity grouped by location:

/weatherservice/by-location?useDocs=temperature,humidity

This might look something like the following:
{location: [{locationId: "Seattle",
temperatures: [{high: "74", low: "57"}],
humidities: [{relativeHumidity: "35%"}]},
... ]}

In this example a substantial result was obtained using merely a few lines of XQuery code.

This manner of obtaining temperatures by location is also significantly fault-tolerant since, if humidity information were not available (in general, or for a particular location) the "humidities" key would simply be absent from the result. The rel:group-results and rel:merge also copy any request metadata from each individual service call into the final result, allowing one to easily see each error that might have occurred. Looking more closely at the query, rel:group-results(rel:merge((rel:result-set("temperature"), rel:result-set("humidity"))), ("location"))
the rel:result-set( ) function is called first with the name of a pipeline component. In this example, this is simply a wrapper around the XQuery standard functions doc( ) and doc-available( ) and if the requested document is not available, rel:result-set( ) returns an empty <resultSet> element.

In this example aggregation framework, every element with a rel:key attribute is said to belong to a "collection" which may be considered a scope for the key. By default, the collection name is the local name of the element, so this attribute, in some instances, is not often used. The rel:key attribute acts in a manner similar to a primary key in SQL databases, except that it can be used in recursive structures. If two elements have the same key and collection name, in this example, the aggregation framework will consider them to belong to the same entity when doing merge operations. This is how, in the example above, the temperatures and humidities for "Seattle" (which belongs to the "location" collection) end up together.

Returning to by_location.xq, we have:
rel:group-results(rel:merge((rel:result-set("temperature"),
    rel:result-set("humidity"))), ("location"))

After retrieving the documents to combine, a sequence may be made from them and passed to rel:merge( ) This function does a recursive merge on a sequence of nodes to produce a single node. The recursive mege is guided by rel:key; if two elements at the same depth in the input documents have the same key and belong to the same collection, they will be merged into a single element with the attributes of both input elements and the children of both input elements merged together according to the same rules. Nodes without rel:key are never merged, in this example. After the call to rel:merge( ) in the example above, the output would look something like this:

```
<resultSet json:type="object">
  <temperature rel:key="Seattle"
      json:combine="list"
      json:key="temperatures">
    <location rel:key="Seattle">Seattle</location>
    <high>74</high>
    <low>57</low>
  </temperature>
  <temperature rel:key="Death Valley"
      json:combine="list"
      json:key="temperatures">
    <location rel:key="Death Valley">Death Valley</location>
    <high>110</high>
    <low>98</low>
  </temperature>
  <humidity rel:key="Seattle" json:key="humidities" json:combine="list">
    <location rel:key="Seattle">Seattle</location>
    <relativeHumidity>35%</relativeHumidity>
  </humidity>
  <humidity rel:key="Death Valley" json:key="humidities" json:combine="list">
    <location rel:key="Death Valley">Death Valley</location>
    <relativeHumidity>21%</relativeHumidity>
  </humidity>
</resultSet>
```

In this instance, the only elements that were merged were the top-level <resultSet> elements. While there are two elements with the key "Seattle", they belong to different collections ("humidity" vs. "temperature") and therefore they are not merged.

In this illustrative example, the next step is to group the results by location using rel:group-results( ). The example aggregation framework provides a function for doing group operations recursively. In this case, the results of the simple grouping operation are:

```
<resultSet json:type="Object">
  <location rel:key="Seattle">
    <locationId>Seattle</locationId>
    <temperature rel:key="Seattle"
        json:combine="list"
        json:key="temperatures">
      <high>74</high>
      <low>57</low>
    </temperature>
    <humidity rel:key="Seattle" json:key="humidities" json:combine="list">
      <relativeHumidity>35%</relativeHumidity>
    </humidity>
  </location>
  <location rel:key="Death Valley">
    <temperature rel:key="Death Valley"
        json:combine="list"
```

```
        json:key="temperatures">
    <high>110</high>
      <low>98</low>
  </temperature>
  <humidity rel:key="Death Valley" json:key=
      "humidities" json:combine="list">
    <relativeHumidity>21%</relativeHumidity>
  </humidity>
</location>
</resultSet>
```

Essentially, the rel:group-results( ) function has taken a list of mixed humidities and temperatures and has returned a list of locations with the relevant temperature and humidity data within each location element. The <location> elements that used to be children of <temperature> and <humidity> elements have been moved with all their attributes to become parents of the elements that used to contain them. Also, the rel:group-results( ) function has added a <locationId> element to the output so that the name of the location will be present after JSON translation, which may ignore attributes.

In some instances, joining results from multiple calls using a rel:join( ) function may be useful. For instance, another call ("GetLocations") may return the following, once mapped:
```
<resultSet json:type="object">
  <location rel:key="Seattle" json:key="locations" json:
      combine="list">
    <name>Seattle</name>
    <latitude>47.606</latitude>
    <longitude>-122.33</longitude>
  </location>
  <location rel:key="Death Valley" json:key="locations"
      json:combine="list">
    <name>Death Valley</name>
    <latitude>36.241944</latitude>
    <longitude>-116.825833</longitude>
  </location>
</resultSet>
```
A component may be defined that will produce temperatures with this additional location data joined into each temperature listing. As an example, the following is a query that will do it:
```
import module namespace rel="http://ws.weatherinfos-
    erv.com/xmins/relations/2009-03-19" at "/com/webser-
    vicedomain/aggregationframework/rel.xq";
rel:join(rel:result-set("temperature"), rel:result-set("loca-
    tions"), "location")
```
The rel:join( ) function takes two documents and a sequence of strings. The first document may be called the destination document while the second may be called the source document, and each string in the sequence may be referred to as a collection name. The result is the destination document with each element in one of the specified collections merged with whatever elements match it in the source document. In the example above, the <location> elements are being merged in the temperature list with the ones in the locations list. The result may resemble the following:

```
<resultSet json:type="object">
  <temperature rel:key="Seattle"
      json:combine="list"
      json:key="temperatures">
    <location rel:key="Seattle" json:key="locations" json:combine=
        "list">
      <name>Seattle</name>
      <latitude>47.606</latitude>
      <longitude>-122.33</longitude>
    </location>
    <high>74</high>
      <low>57</low>
  </temperature>
  <temperature rel:key="Death Valley"
      json:combine="list"
      json:key="temperatures">
    <location rel:key="Death Valley" json:key=
        "locations" json:combine="list">
      <name>Death Valley</name>
      <latitude>36.241944</latitude>
      <longitude>-116.825833</longitude>
    </location>
    <high>110</high>
      <low>98</low>
  </temperature>
</resultSet>
```

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out various embodiments. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method of providing information to a requestor of content, comprising:
   under control of one or more computer systems configured with executable instructions,
      receiving a request for the content from the requestor, the request specifying at least one characteristic;
      identifying a plurality of web services, each of the web services being operable to provide at least a subset of a set of data responsive to the request according to said at least one characteristic;
      requesting at least a portion of the data from each of the identified web services;
      receiving responses from the web services, the received responses being organized according to original schemas, at least two of the original schemas being different; and
      combining, based at least in part on a mapping between the original schemas and a common schema, information from the received responses into a new document that includes the combined information, wherein the common schema of the new document is based at least in part on the received request, the combining of information from the received responses comprising:
         organizing the information from the received responses according to a preliminary schema; and
         reorganizing the information from the received responses from the preliminary schema according to a destination language schema.

2. The computer-implemented method of claim 1, wherein the preliminary schema defines a plurality of elements, wherein a particular element includes an attribute, and wherein organizing the information from the received responses according to the preliminary schema comprises:
   creating an instance of the particular element; and
   assigning a value for the attribute of the instance, the value indicative of how information from the instance should be organized according to the destination language schema.

3. The computer-implemented method of claim 2, wherein reorganizing the information from the received responses comprises:
   identifying instances of the elements having attributes assigned common values; and
   collecting information from the identified instances into a common structure of the destination language schema.

4. The computer-implemented method of claim 1, wherein identifying the web services comprises locating the web services according to a map that associates request types with web services that are applicable to the request types.

5. A computer-implemented method of providing content, comprising:
   under control of one or more computer systems configured with executable instructions,
      receiving a request from a requestor, the request characterizing desired information;
      identifying a plurality of information sources that are each operable to provide at least a subset of a set of data responsive to the request;
      requesting from each of the identified information sources a response that is in accordance with the request from the requestor;
      receiving responses from the information sources, the responses being organized according to a plurality of original schemas, at least two of the original schemas being different; and
      combining, based at least in part on a mapping from the original schemas to a common schema, information from the responses into a new document that includes the combined information based at least in part on the received request, the combining of information comprising:
         organizing the information from the responses according to a preliminary schema; and
         converting the information organized according to the preliminary schema to information stored according to one or more destination language objects.

6. The computer-implemented method of claim 5, wherein the preliminary schema defines a plurality of elements having attributes, wherein said organizing the information includes assigning at least one value to at least one attribute of at least one instance of the elements, and wherein converting the organized information is performed based at least in part on said at least one value.

7. The computer-implemented method of claim 5, wherein the request from the requestor is of a particular type and wherein identifying the plurality of information sources includes referencing a map to identify the information sources based at least in part on the particular type.

8. The computer-implemented method of claim 5, wherein the common schema employs one or more elements and wherein the combined information includes a plurality of instances of a particular element, the particular element having an attribute, each of the plurality of instances having a corresponding value for the attribute, and wherein combining information includes collecting a subset of the instances sharing a common value for the attribute into a destination language object.

9. A computer-implemented method of providing information, comprising:
   under control of one or more computer systems configured with executable instructions,
      receiving a content request from a requestor;
      identifying a plurality of eligible information sources that are capable of providing data at least partially responsive to the information request;
      for each identified information source, preparing a data request according to a schema accepted by the identified information source and sending the prepared data request to the identified information source;
      receiving responses to the prepared data requests from the eligible information sources, at least one of the responses differing from a common schema;
      homogenizing the responses according to the common schema; and
      combining information from the homogenized responses into a new document that includes the combined information based at least in part on the received content request by preparing at least one destination language object that includes at least some of the information from the homogenized responses.

10. The computer-implemented method of claim 9, wherein the common schema employs a plurality of elements, wherein homogenizing the responses includes assigning attributes to a plurality of the elements, and wherein said at least one destination language object includes information from a plurality of elements that are assigned a common attribute.

11. The computer-implemented method of claim 9, wherein, for at least one identified information source, preparing the data request includes converting the information request into a format acceptable by said at least one identified information source.

12. The computer-implemented method of claim 9, wherein the information sources are web services.

13. A computer-readable storage medium having stored thereon instructions for causing at least one computer system to provide information to a requestor, the instructions comprising:
    instructions that cause said at least one computer system to receive an information request from the requestor;
    instructions that cause said at least one computer system to identify a plurality of eligible information sources that are capable of providing data at least partially responsive to the information request;
    instructions that cause said at least one computer system to, for each identified information source, prepare a data request according to a schema accepted by the identified information source;
    instructions that cause said at least one computer system to, send the prepared data requests to the identified information sources;
    instructions that cause said at least one computer system to receive responses from the eligible information sources;
    instructions that cause said at least one computer system to homogenize the responses according to a common schema; and
    instructions that cause said at least one computer system to combine information from the homogenized responses into a new document that includes the combined information based at least in part on the received information request, the instructions that cause the at least one computer system to combine information including instructions that cause the at least one computer system to prepare at least one destination language object that includes at least some of the information from the homogenized responses.

14. The computer-readable storage medium of claim 13, wherein the common schema employs a plurality of elements, wherein the instructions that cause said at least one computer system to homogenize the responses includes the instructions that cause said at least one computer system to assign attributes to a plurality of the elements, and wherein said at least one destination language object includes information from a plurality of elements that are assigned a common attribute.

15. The computer-readable storage medium of claim 13, wherein, for at least one identified information source, the instructions that cause said at least one computer system to prepare the data request include the instructions that cause said at least one computer system to convert the information request into a format acceptable by said at least one identified information source.

16. The computer-readable storage medium of claim 13, wherein the information sources are web services.

17. A system for providing information, comprising:
    a communication device operable to receive a request from a requestor and provide a response responsive to the request; and
    at least one processor operable to:
        identify a plurality of information sources that are each operable to provide at least a subset of a set of data responsive to the request;
        request from each of the identified information sources a response that is in accordance with the request from the requestor;
        receive responses from the information sources, the responses being organized according to a plurality of original schemas, at least two of the original schemas being different;
        combine, based at least in part on a mapping from the original schemas to a common schema, information from the responses into a new document that includes the combined information based at least in part on the received request;
        organize the information from the responses according to a preliminary schema; and
        convert the information organized according to the preliminary schema to information stored according to one or more destination language objects.

18. The system of claim 17, wherein the preliminary schema defines a plurality of elements having attributes, wherein said at least one processor is operable to assign at least one value to at least one attribute of at least one instance of the elements, and wherein said at least one processor is operable to convert the organized information is performed based at least in part on said at least one value.

19. The system of claim 17, wherein the request from the requestor is of a particular type and wherein said at least one processor is operable to identify the information sources based at least in part on the particular type.

20. The system of claim 17, wherein the request is a web service request and the response responsive to the request is a web service response.

* * * * *